United States Patent [19]
Cozza

[11] Patent Number: 5,473,769
[45] Date of Patent: Dec. 5, 1995

[54] METHOD AND APPARATUS FOR INCREASING THE SPEED OF THE DETECTING OF COMPUTER VIRUSES

[76] Inventor: Paul D. Cozza, HC 61, Box 023A, Damariscotta, Me. 04543

[21] Appl. No.: 938,374

[22] Filed: Aug. 31, 1992

Related U.S. Application Data

[63] Continuation-in-part of Ser. No. 860,048, Mar. 30, 1992.
[51] Int. Cl.$^6$ .............................. G06F 7/02; G06F 15/40; H04L 9/00
[52] U.S. Cl. ..................... 395/183.15; 380/4; 395/440
[58] Field of Search ................. 395/575; 380/4; 364/550; 371/68.3, 67.1

[56] References Cited

U.S. PATENT DOCUMENTS

5,121,345  6/1992  Lentz ...................................... 364/550
5,278,901  1/1994  Shieh et al. ................................. 380/4

FOREIGN PATENT DOCUMENTS

3-233629  1/1991  Japan.
93-25024  12/1993  WIPO.

OTHER PUBLICATIONS

Hirst, "Getting inside PC viruses", Tech. PC user Journal vol.: V1, issue: Ng, p. 22(5), Puslished May 1989.

Primary Examiner—Hoa T. Nguyen
Attorney, Agent, or Firm—Hale and Dorr

[57] ABSTRACT

A method and apparatus for increasing the speed at which a computer can scan files for computer viruses examines the initial state information of each file and stores this state information in a cache. Since viruses generally add themselves to preexisting files, they generally change the lengths or other characteristics of the files. During a scan, current state information is gathered regarding the length and/or other characteristics of the current state of the file and this information is compared to the length and characteristics from the initial state of the file. If the initial state information is different than the current state information then the files are scanned for certain subsets of viruses which affect files in a manner which is determined by the differences in such initial and current state information.

16 Claims, 5 Drawing Sheets

TABLE 1: MACINTOSH SCAN INFORMATION CACHE FILE STRUCTURE

| FIELD | DESCRIPTION | SIZE (IN BYTES) |
|---|---|---|
| HEADER | OCCURS ONCE AT THE FILE START | (14 TOTAL) |
| VERSION | VERSION NUMBER OF SOFTWARE CREATING FILE | 2 |
| VOLUMECRDATE | CREATION DATE OF VOLUME ON WHICH FILE RESIDES | 4 |
| CACHEFILEID | FILE IDENTIFIER OF CACHE FILE (FROM SYSTEM) | 4 |
| CHECKSUM | CHECKSUM TO VERIFY FILE CONTENTS | 4 |
| | | |
| FILE INFORMATION | ONE SET OF FIELDS FOR EACH FILE SCANNED | (12 TOTAL/FILE) |
| FILEID | FILE IDENTIFIER OF FILE (FROM SYSTEM) | 4 |
| RESFORKLEN | FILE RESOURCE FORK LENGTH | 4 |
| DATAFORKLEN | FILE DATA FORK LENGTH | 4 |

FIGURE 5

METHOD AND APPARATUS FOR INCREASING THE SPEED OF THE DETECTING OF COMPUTER VIRUSES

CROSS REFERENCE TO RELATED APPLICATION

This application is a continuation-in-part application of U.S. patent application Ser. No. 07/860,048 filed on Mar. 30, 1992.

BACKGROUND OF INVENTION

This invention relates to a method and apparatus for detecting computer viruses, and more particularly to a method and apparatus for increasing the speed at which a computer can scan for the presence of a virus.

The computer field in general has been plagued by the introduction of programs known as computer "viruses", "worms",or "Trojan horses." These programs are often introduced for malicious reasons, and often result in significant damage to both stored data and other software. Many software solutions have been devised to help counter this growing threat to computer file integrity. Among these solutions is a general virus scanner program which scans a file or set of files, for particular known viruses. This method of virus detection is particularly effective against known viruses.

Computer viruses have the particular property of being able to replicate themselves and thus spread from one computer file to another, one computer volume to another, and eventually, from one machine to another. The virus may not be designed to do anything intentionally malicious, but to qualify as a virus, it must have the capability of replicating itself. This distinguishes computer viruses from programs such as "Trojan horses."

Viruses may spread in a number of ways. For example, a virus may spread by adding itself to code that already exists within some program on a computer, then changing that preexisting code in such a way that the newly added viral code will be executed. This will then enable the virus to execute again and replicate itself in yet another program. Examples of such viruses that have affected the Apple Macintosh computer are commonly referred to as nVIR, Scores, ZUC, and ANTI.

A virus may also add itself to some preexisting program (or to the system), but may do so in such a way that it will be automatically executed by the system software running on the computer. It will thus not have to actually modify any preexisting code. Examples of such viruses that have affected the Apple Macintosh computer are named WDEF and CDEF.

The general method for virus scanning is to examine all volume information and files that may be infected by a virus. During the scan each individual virus (or group of viruses) is searched for by looking for the actual viral code, or certain other telltale signs of a virus, such as modified program code. The simplest method to accomplish this is to look for a predetermined string of hexadecimal bytes, the presence of which indicates a specific virus infection. Currently available programs distributed under the names SAM and Disinfectant scan in this manner.

Referring to FIG. 1, the operation of a typical scanning process for a Macintosh computer will now be described. Each volume or directory of files is scanned with the scan starting in step 10. In a preferred embodiment, each file of the volume is scanned starting in step 12. Each file is scanned by examining its resource fork in step 14 and its data fork in step 15 for viruses. Note that the scan process may be as simple as determining that the file is not of a type infected by viruses, or that the file has no resource or data fork, and thus does not have to be examined directly for the presence of a virus. On computers which do not have separate resource and data forks the data file itself is scanned. Volumes may also be scanned for viruses. This process is repeated for each volume and each file.

In recent years, not only has the number of viruses increased, but the frequency with which they appear has also generally increased. As the number of viruses increase, the anti-virus programs which use file scanning technologies to search for these viruses must increase their scanning capabilities to handle the new viruses. This increased scanning capability requires extra time to accomplish the scan. Further limitations are imposed on systems which have users with large numbers of files requiring scanning or with moderate to slow computer systems. The overall result of these additional limitations is an increase in the amount of time needed to detect viruses, with a future that promises further increases.

In order to reduce the time it takes to scan for a virus, other solutions have been developed. One such solution introduces programs which detect viral activity, but do not detect specific viruses. Such programs are useful, especially if used in conjunction with vital scanning programs. Such programs, however, do not have the required power and ease of use necessary to supplant the virus scanning programs.

Finally, other solutions simplify and improve detection software in order to speed performance. This has also been useful but as the number of computer viruses increase (sometimes at a seemingly exponential rate), the slowdown due to this increase cancels any time improvement gained from simplifying the software.

It is, therefore, a principal object of the present invention to provide a method and apparatus for increasing the speed at which a computer can scan for the presence of a computer virus.

Another object of the present invention is to provide a method and apparatus for scanning for a computer virus which eliminates the necessity of scanning all portions of all files and volumes for all viruses.

SUMMARY OF INVENTION

The method and apparatus of the present invention for scanning files for computer viruses relies on the fact that viruses invariably change the file or volume they infect. Consequently, information detailing the initial "state" of an uninfected file or volume can be "cached" or securely saved to disk or other non-volatile storage medium. The cached information is dependent not only on the type of machine the scanning program is running on, but also on viruses' method of infection on that type of machine. The stored information can be tailored to meet the variety of situations found in present and future computing environments.

Once the initial "state" information has been stored to a disk or other non-volatile storage medium, the method and apparatus of the present invention can use this cached information in future virus scans to determine what files and/or volumes have changed in a way indicative of most virus infections. In many applications this information alone is enough to eliminate the need to scan a file/volume for most, if not all, viruses.

Since viruses add themselves to preexisting software, they will usually be changing the lengths or other characteristics of the files or volumes they infect. It is these lengths and other characteristics that can be stored in a cache, and compared with the current states of files and volumes. A determination can be made as to how the state of a file or volume has changed by comparing such length(s) and characteristic(s) with length(s) and characteristic(s) for previously stored state(s). Depending upon this determination, the process may scan for different subsets of viruses. For example, if the length of a file is stored as part of the cache, then if a file's length remains the same as determined by comparing the file's precise length with that stored in the cache, then it is not necessary to scan for those viruses which change a file's length. For the same reasons, when certain characteristics of a file or volume remain the same, then it is not necessary to scan for those viruses which change those certain file or volume characteristics. It is thus clear that proper selection of the file and volume characteristics to be stored in the cache will guarantee a great scanning speed increase by eliminating unnecessary, repeat scanning in return for a very modest cost in terms of disk or other non-volatile storage medium.

These and other objects and features of the present invention will become more fully understood from the following detailed description which should be read in light of the accompanying drawings in which corresponding reference numerals refer to corresponding steps or parts throughout the several views.

BRIEF DESCRIPTION OF THE DRAWINGS AND TABLE

Figure 1:
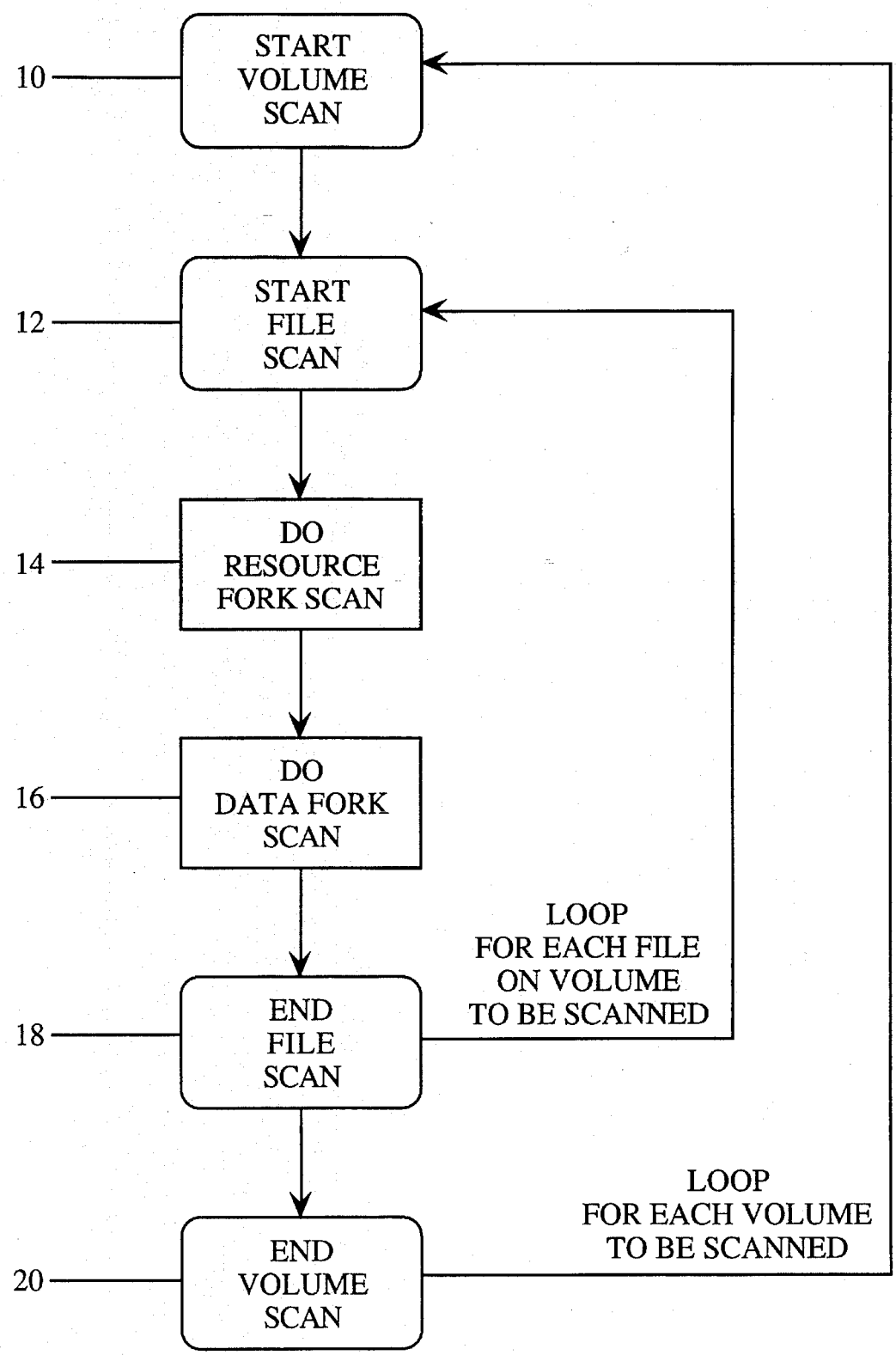
FIG. 1 is a block diagram of the basic operation of a prior art scanning method designed for use with an Apple Macintosh computer which scans volumes for known viruses.
Figure 2:
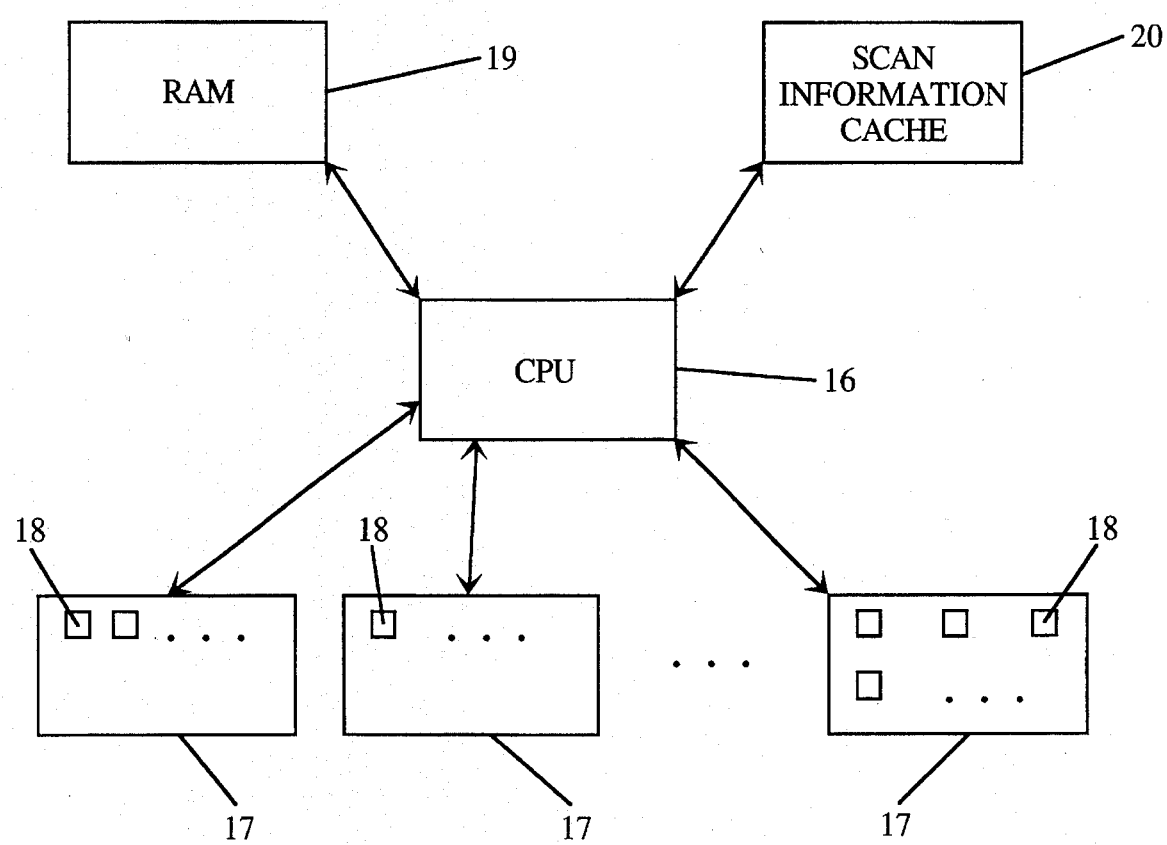
FIG. 2 is a block diagram of the apparatus of the present invention.
Figure 4:
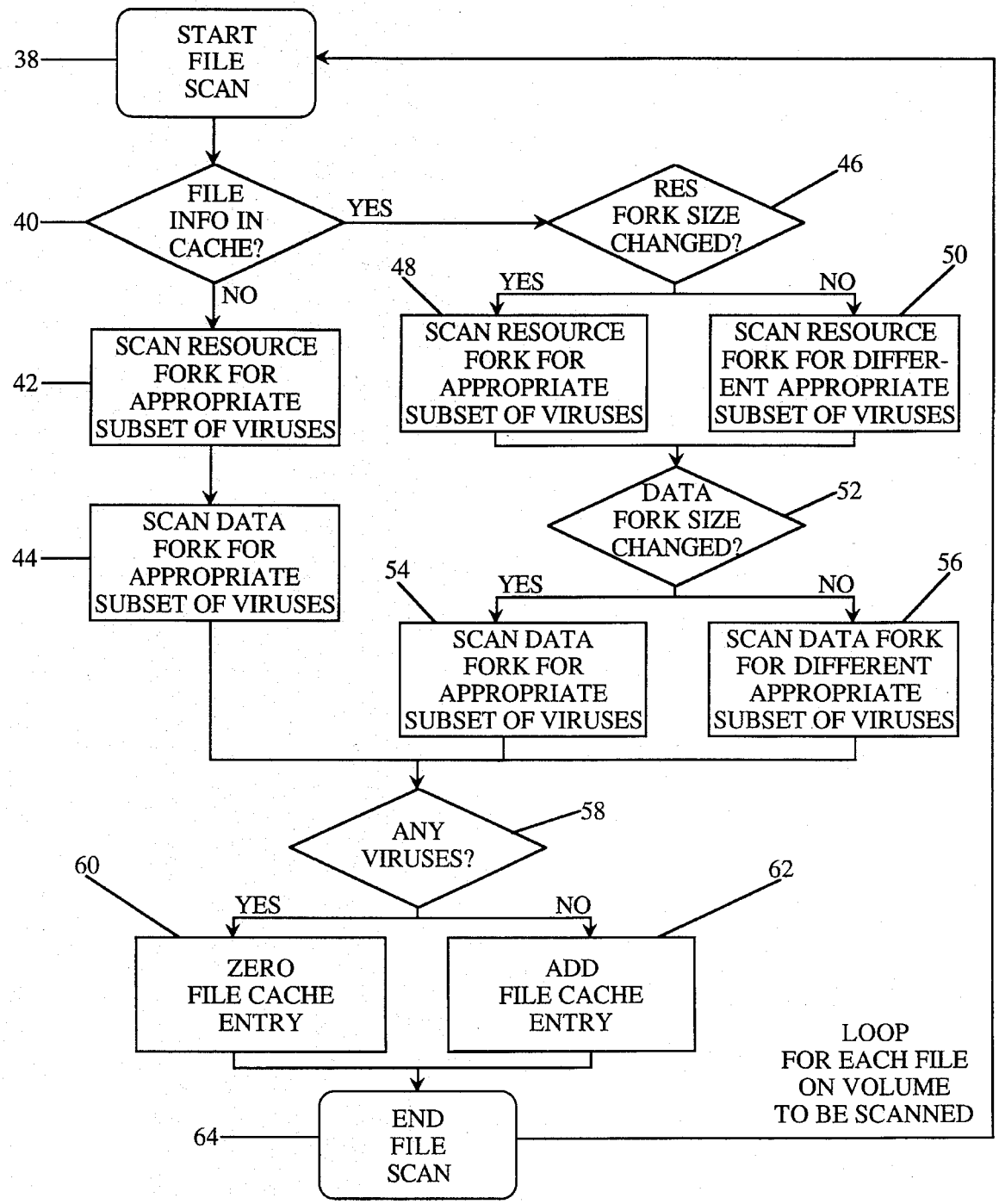

FIG. 4 provides a block diagram of the process for scanning files of volumes scanned in accordance with the process of FIG. 2.

FIG. 5 is a table of the scan information cache.

DETAILED DESCRIPTION

Referring to FIG. 2, the apparatus for detecting computer viruses of the present invention includes a central processing unit 16. Information concerning the current state of volumes 17 or files 18 is stored in RAM 19, and information concerning prior states is stored in the scan information cache(s) 20. The cache 20 can be stored in any non-volatile storage medium including, but not limited to, the files or volumes being scanned.

Figure 3:
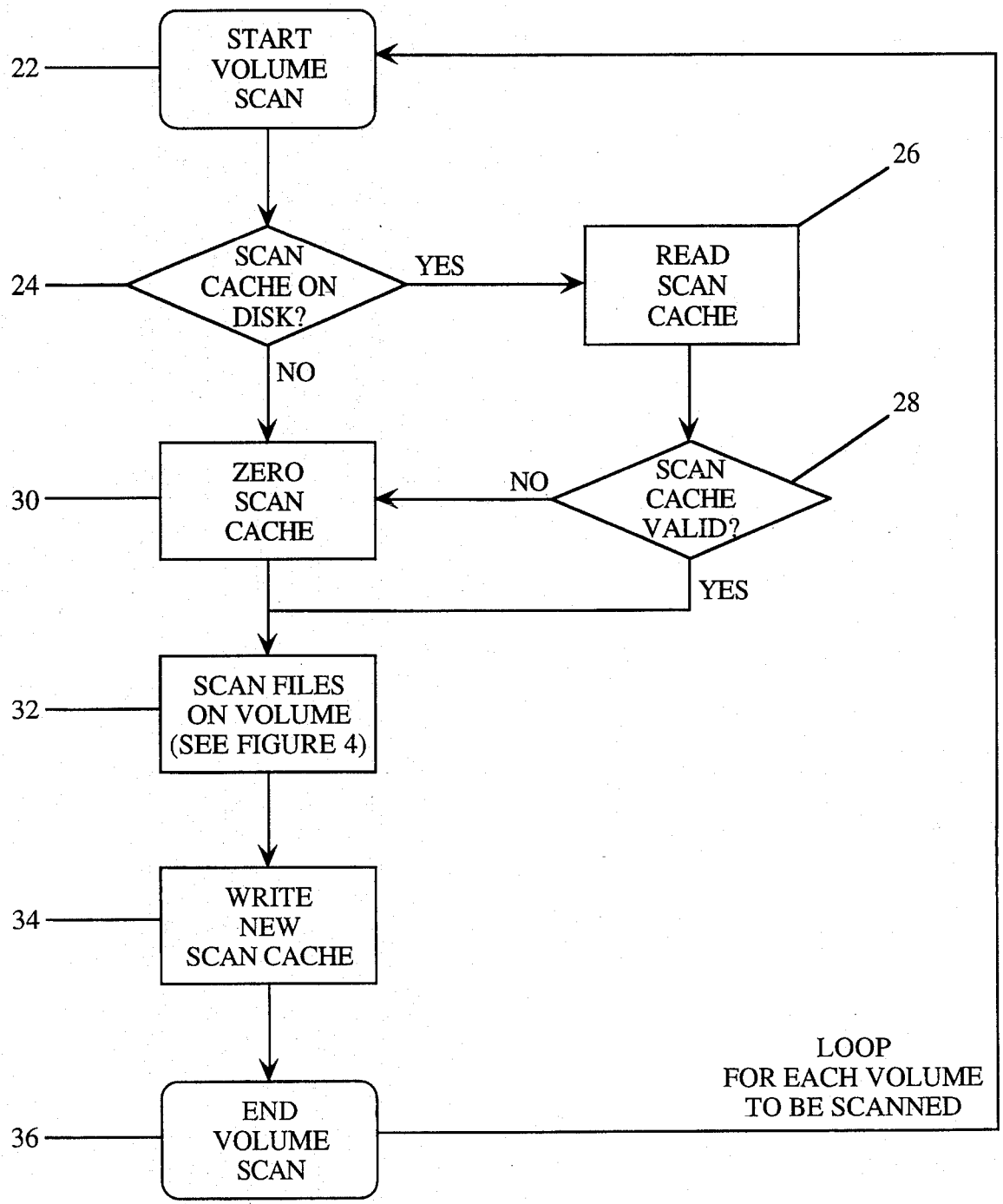
FIG. 3 is a block diagram of the operation of the scanning method shown in FIG. 1 which has been modified to utilize the method of the present invention.

Referring now to FIG. 3, the process for scanning for computer viruses of the present invention will now be described. In this process, which while described with reference to a Macintosh computer may be used with virtually any other computer, each volume 17 with its files or any subset thereof stored in a memory system is scanned. Before commencing the actual scan, however, the volume being scanned is examined for the scan information cache (which, in a preferred embodiment, is a file) in step 24 which is located at a predetermined place on the volume being scanned or on some other accessible volume. If the file is found, it is read into RAM or some other high speed memory in step 26, and its contents are verified in step 28. For example on the Apple Macintosh computer such verification could involve validating the cache's 1) version number to make sure it is not out of date; 2) volume creation date to make sure the file is on the correct volume; 3) file ID to make sure the cache file is not a copy, and that the volume has not been reformatted; and 4) checksum to verify the file's content. One suitable checksum could be determined by starting with an arbitrary (randomly selected) string of 4 hexadecimal bytes, called the key, which is known to the scanning program. An EOR (i.e., Exclusive Or) operation is performed on each long word (4 bytes) of the cache to the key. The result is the checksum. Simple variations of this may be used if the cache information is not a multiple of 4 bytes long.

If the cache is valid, it is retained in memory for the scanning of the files in that volume in step 32. If the cache's contents are invalid or if no cache exists on the volume, the in-memory cache is simply zeroed in step 30. Files are then scanned in step 32 as detailed below in connection with the description of FIG. 4. After all of the files have been scanned a new cache is written to disk in step 34. As shown in the cache data structures in FIG. 5, the new cache includes data that has been accumulated during the scanning of files, data about the cache itself, i.e. its version, volume creation date, file id, and checksum, and scan information for each file scanned. This completes the scanning of a volume, and if there are additional volumes to be scanned, the above process is repeated for each volume in step 36.

The process for scanning each file in a volume will now be described with reference to FIG. 4. For each file on a volume that is to be scanned, the cache is searched for the presence of the file's cache information in step 40. This is indicated by the presence or absence of the file's file id in the cache (see FIG. 5). Note that if the cache did not exist or if it was invalid, then the file will not be found as the in-memory cache was zeroed. If the file's information is not found (indicating that the file needs to be freshly scanned), then it is scanned for a subset of those viruses which infect the computer being scanned, which subset includes viruses which infect this type of file, including those that infect the file resource fork in step 42 and those that infect the data fork in step 44.

If the file's scan information is found in the cache then the resource fork length of the file is compared with that stored in the cache in step 46. If the resource fork lengths differ, then the file resource fork has been modified and must be rescanned in step 48 for a subset of those viruses which infect the computer of the file(s) being scanned, which subset includes (but is not limited to) viruses which infect resource forks, infect the type of file being scanned and change the resource fork size. If the resource fork size is identical with that stored in the cache, then some different subset of viruses which infect resource forks only needs to be scanned for in step 50. That is, the program need only scan for viruses which infect resource forks but do not change the length of the resource fork, or which have the capability of modifying the scan cache in a attempt to hide themselves. Other viruses may but do not need to be included in this latter subset however. For example, at the present time there are no such viruses that affect the resource forks of files on Apple Macintosh computers without changing the resource fork length, so no scanning would be necessary in step 50 if this scanning method is used with an Apple Macintosh computer.

If the file's scan information is found in the cache, then the data fork length of the file is also compared with that stored in the cache. If the data fork length is determined to differ in step 52, then the file data fork has been modified and must be rescanned for a subset of those viruses which infect the computer with the file(s) being scanned, which subset includes (but is not limited to) viruses which infect data forks, infect the type of file being scanned and change the data fork size, in step 54. If the data fork size is identical to that stored in the cache, then some different subset of viruses which infect data forks only needs to be scanned for in step 56. Specifically, the program need only scan for viruses which infect data forks but do not change the length of the data fork, or which have the capability of modifying the scan cache in an attempt to hide themselves. Other viruses may be included in this latter subset however.

After all virus scanning for a file is completed, the scan cache must be updated. It is preferable to keep a second, new cache in memory separate from the original cache and update that with the new information for each file on the disk (thus eliminating outdated information in the old cache). To update the cache, the scan results are checked to determine whether any virus was found in step 58. If a virus was found, then the scan cache is updated with zeroed information for the file in step 60, which will force the file to be completely scanned again in the future. If no viruses were found in the file, then the file's scan information is added to the new cache in step 62. This information includes the file's ID, resource fork length and data fork length. Steps 38 through 64 are repeated for each scannable file on the disk. When all files have been scanned on the volume, the new, updated cache is written to disk on the volume scanned (34).

While the foregoing invention has been described with reference to its preferred embodiments, various alterations and modifications will occur to those skilled in the art. For example, while the invention has been described in connection with operation on an Apple Macintosh computer, the invention can be used with other computers even if such computers do not have separate resource and data forks. In all computers whether the files have single or multiple forks, the method and apparatus of the present invention operate by storing information regarding files and or volumes in any non-volatile memory so that it can be read back at a later time and compared against current information. All such alterations and modifications are intended to fall within the scope of the appended claims.

What is claimed is:

1. A method for increasing the speed at which a computer scans for the presence of a computer virus, said method comprising the steps of:

gathering initial state information about an initial state of a file and storing said initial state information in a scan information cache on a non-volatile storage medium;

storing said initial state information in said scan information cache;

gathering current state information about a current state of said file;

determining how said initial state information stored in said scan information cache for said file differs from said current state information thereby indicating a presence or absence of one or more subsets of computer viruses, said one or more subsets each including one or more viruses which affect state information of said file in certain characteristic manners;

scanning said file for one or more of said subsets of computer viruses of a type of computer viruses that are determined to be present.

2. The method for increasing the speed at which a computer scans for the presence of a computer virus of claim 1 further comprising the step of scanning said file, for which said initial state information is not found in said scan information cache, for a subset of those viruses which infect computers of the same type as said computer, said subset including viruses that can infect files of the same type as said file.

3. The method for increasing the speed at which a computer scans for the presence of a computer virus of claim 1 further comprising the step of updating said scan information cache by placing a specific indicative value in at least one memory location in said scan information cache, said at least one memory location corresponding to a file in which a virus is found.

4. The method for increasing the speed at which a computer scans for the presence of a computer virus of claim 1 further comprising the step of updating said scan information cache with new information concerning a state of said file if no virus is found in said file.

5. A method for increasing the speed at which a computer scans for the presence of a computer virus, said method comprising the steps of:

gathering initial state information about an initial state of a volume and storing said initial state information in a scan information cache on a non-volatile storage medium;

storing said initial state information in said scan information cache;

gathering current state information about a current state of said volume;

determining how said initial state information stored in said scan information cache for said volume differs from said current state information for said volume thereby indicating a presence or absence of one or more subsets of computer viruses, said one or more subsets each including one or more viruses which affects state information of said volume in certain characteristic manners;

scanning said volume for one or more of said subsets of computer viruses of a type of computer viruses that are determined to be present.

6. The method for increasing the speed at which a computer scans for the presence of a computer virus of claim 5 further comprising the step of scanning said volume, for which said initial state information is not found in said scan information cache, for a subset of those viruses which infect computers of the same type as said computer, said subset including viruses that can infect volumes of the same type as said volume.

7. The method for increasing the speed at which a computer scans for the presence of a computer virus of claim 5 further comprising the step of updating said scan information cache by placing a specific indicative value in at least one memory location in said scan information cache, said at least one memory location corresponding to a volume in which a virus is found.

8. The method for increasing the speed at which a computer scans for the presence of a computer virus of claim 5 further comprising the step of updating said scan information cache with new information concerning a state of said volume if no virus is found in said volume.

9. An apparatus that can rapidly scan for the presence of a computer virus comprising:

a scan information cache on a non-volatile storage medium;

means for gathering initial state information about an initial state of a file stored on a computer storage medium and storing said initial state information in said scan information cache;

means for storing said initial state information in said scan information cache;

means for gathering current state information about a current state of said file;

means for determining how said initial state information stored in said scan information cache for said file differs from said current state information for said file thereby indicating a presence or absence of one or more subsets of computer viruses, said one or more subsets each including one or more viruses which affect state information of said file in certain characteristic manners;

means for scanning said file for one or more of said subsets of computer viruses of a type of computer viruses that are determined to be present, said means for scanning being operated by a computer having access to said computer storage medium.

10. The apparatus that can rapidly scan for the presence of a computer virus of claim 9 further comprising means for scanning said file, for which said initial state information is not found in said scan information cache, for a subset of those viruses which infect computers of the same type as said computer, said subset including viruses that can infect files of the same type as said file.

11. The apparatus that can rapidly scan for the presence of a computer virus of claim 9 further comprising means for updating said scan information cache by placing a specific indicative value in at least one memory location in said scan information cache, said at least one memory location corresponding to a file in which a virus is found.

12. The apparatus that can rapidly scan for the presence of a computer virus of claim 9 further comprising means for updating said scan information cache with new information concerning a state of said file if no virus is found in said file.

13. An apparatus that can rapidly scan for the presence of a computer virus comprising:

a scan information cache on a non-volatile storage medium;

means for gathering initial state information about an initial state of a volume stored on a computer storage medium and storing said initial state information in said scan information cache;

means for storing said initial state information in said scan information cache;

means for gathering current state information about a current state of said volume;

means for determining how said initial state information stored in said scan information cache for said volume differs from said current state information for said volume thereby indicating a presence or absence of one or more subsets of computer viruses, said one or more subsets each including one or more viruses each which affect state information of said volume in certain characteristic manners;

means for scanning said volume for one or more of said subsets of computer viruses of a type of computer viruses that are determined to be present, said means for scanning being operated by a computer having access to said computer storage medium.

14. The apparatus that can rapidly scan for the presence of a computer virus of claim 13 further comprising means for scanning said volume, for which said initial state information is not found in said scan information cache, for a subset of those viruses which infect computers of the same type as said computer, said subset including viruses that can infect volumes of the same type as said volume.

15. The apparatus that can rapidly scan for the presence of a computer virus of claim 13 further comprising the step of updating said scan information cache by placing a specific indicative value in at least one memory location in said scan information cache, said at least one memory location corresponding to a volume in which a virus is found.

16. The apparatus that can rapidly scan for the presence of a computer virus of claim 13 further comprising the step of updating said scan information cache with new information concerning a state of said volume if no virus is found in said volume.

* * * * *